United States Patent
Johnson

(10) Patent No.: US 10,250,440 B2
(45) Date of Patent: Apr. 2, 2019

(54) MANAGING A GENERATION AND DELIVERY OF DIGITAL IDENTITY DOCUMENTS

(71) Applicant: INTERNATIONAL BUSINESS MACHINES CORPORATION, Armonk, NY (US)

(72) Inventor: Asher C. Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/363,463

(22) Filed: Nov. 29, 2016

(65) Prior Publication Data

US 2018/0152340 A1   May 31, 2018

(51) Int. Cl.
*G06F 17/00* (2006.01)
*H04L 12/24* (2006.01)
(Continued)

(52) U.S. Cl.
CPC ...... *H04L 41/082* (2013.01); *G06F 17/30867* (2013.01); *H04L 41/5006* (2013.01);
(Continued)

(58) Field of Classification Search
CPC ... H04L 41/082; H04L 41/5006; H04L 67/10; H04L 51/12; H04L 63/0428; G06F 17/30867; G06Q 50/265
See application file for complete search history.

(56) References Cited

U.S. PATENT DOCUMENTS 7,852,865 B2 * 12/2010 Gay ..................... H04L 12/2801
                                                370/412
8,200,765 B2 *  6/2012 Bittles ................. G06Q 10/107
                                                709/206
(Continued)

OTHER PUBLICATIONS

Gisolfi, Dan; Arizona takes inside lane on adoption of digital licenses; IBM Emerging Technologies blog; http://blog.ibmjstart.net/2016/09/14/arizona-takes-inside-lane-adoption-digital-licenses/; Sep. 14, 2016; 5 pages.
(Continued)

*Primary Examiner* — Beemnet W Dada
(74) *Attorney, Agent, or Firm* — Schmeiser, Olsen & Watts; David Woycechowsky

(57) ABSTRACT

An approach is provided for managing requests by a cloud-based multipurpose messaging queue (MPMQ) located in a first computer. For each given request in requests received by the MPMQ, the MPMQ receives a specification of whether the given request is a standard or a critical request based on whether the given request requires an action by a second computer of a third party to respond to the given request. On condition that the received specification indicates that the given request is the critical request, a first message is added to a critical message queue to be accessed by the second computer, with the first message including response information helpful to the second computer in responding to the given request corresponding to the first message. On condition that the received specification indicates that the given request is the standard request, a first message is added to a standard message queue.

13 Claims, 7 Drawing Sheets

(51) Int. Cl.
    *G06F 17/30*     (2006.01)
    *H04L 29/08*     (2006.01)
    *H04L 12/58*     (2006.01)
    *H04L 29/06*     (2006.01)
    *G06Q 50/26*     (2012.01)

(52) U.S. Cl.
    CPC .......... *H04L 51/12* (2013.01); *H04L 63/0428* (2013.01); *H04L 67/10* (2013.01); *G06Q 50/265* (2013.01)

(56) References Cited

U.S. PATENT DOCUMENTS

| | | |
|---|---|---|
| 8,842,841 B2 | 9/2014 | Hook et al. |
| 9,741,011 B2 * | 8/2017 | Beach-Drummond .................... G06Q 10/08355 |
| 2002/0087507 A1 * | 7/2002 | Hopewell ............... G06F 9/546 |
| 2011/0246765 A1 | 10/2011 | Schibuk |
| 2012/0072914 A1 | 3/2012 | Ota |
| 2015/0007263 A1 | 1/2015 | Stewart et al. |
| 2015/0088970 A1 | 3/2015 | Wei et al. |
| 2016/0055042 A1 | 2/2016 | Kwong et al. |
| 2016/0285812 A1 * | 9/2016 | Yao ........................ H04L 51/26 |

OTHER PUBLICATIONS

Anonymous; System and method to prevent spoofing from trusted devices under disguise; ip.com; IPCOM000236612D; May 6, 2014; 10 pages.

Anonymous; Dynamic Messaging in Data Loading Services; ip.com; IPCOM000246593D; Jun. 20, 2016; 6 pages.

\* cited by examiner

MANAGING A GENERATION AND DELIVERY OF DIGITAL IDENTITY DOCUMENTS

BACKGROUND

The present invention relates to managing requests for digital identity documents and generating digital identity documents, and more particularly with managing inter-server communication for the generation and delivery of digital identity documents. As used herein, a digital identity document is a set of machine readable data that has the following characteristics: (1) a set of information defining an institution that issues the digital identity document, (2) a set of information defining a user, and (3) a set of personal identification information describing the user as defined by the institution. For example, a digital identity document may be a digital driver's license that includes identity characteristics of a driver that, taken together, uniquely identify the driver to a law enforcement officer, where the identity characteristics are defined by a state's Department of Motor Vehicles and may include the driver's height, weight, eye color, a photo of the driver, and a license number.

Message queues are a known technique that provide an asynchronous communications protocol. This means that the sender and receiver of the message do not need to interact with the message queue at the same time. Messages received by the queue are stored until the recipient(s) retrieve them. Typically, message queues limit: (i) the size of data that may be transmitted in a single message and/or (ii) the number of messages that may remain outstanding on the queue. Some message queues (MQs) function internally, such as, within an operating system or within an application. Other MQs allow the passing of messages between different computer systems, potentially connecting multiple applications and multiple operating systems. Some known MQs are implemented as cloud-based message queuing service options. In a typical message-queueing implementation, a system administrator installs and configures MQ software (for example, a queue manager or broker), and defines a named message queue. An application then registers a software routine that "listens" for messages placed onto the queue. Subsequent applications connect to the queue and transfer messages onto the MQ. The queue-manager software stores the messages until a receiving application connects and then calls the registered software routine. The receiving application then processes the message in an appropriate manner. Some known semantics of message passing include one, or more, of the following characteristics: (i) durability (messages may be kept in memory, written to disk, or even committed to a database management system if the need for reliability indicates a more resource-intensive solution); (ii) security policies (to determine which applications should have access to the messages); (iii) message purging policies (queues or messages may be subject to time limitations); (iv) message filtering (filtering data so that a subscriber may only see messages matching some pre-specified criteria of interest); (v) delivery policies (guarantees that a message on the number of times a message is delivered); (vi) routing policies (in a system with many queue servers, determination of which servers should receive a message or an MQ's messages); (vii) batching policies; (viii) queuing criteria (determination of the conditions under which a message should be considered as being "enqueued"); (ix) receipt notification (a publisher may need to know when subscribers have received a message).

Digital identity is an emerging area of business that employs a cloud-based cryptographic framework for issuing, managing, and challenging digital identity documents, while securing the information in the digital identity documents from identity theft, sharing only the identity information that is needed for a particular proof of identification request, and keeping track of multiple digital identity cards stored on mobile devices. The management of digital identity documents involves a common set of relationships among the individual whose identity is specified by the digital identity documents, issuers which are institutions that provide the digital identity documents, and verifiers who validate the individual's identity by accessing the digital identity documents. A digital identity includes identity traits of an individual's identity information (e.g., date of birth and the individual's photo). Digital identity documents include the identity traits. Some current digital identity documents have one or more of the following characteristics: (i) encrypt data corresponding to identity traits; (ii) use security tokens assigned by issuers; (iii) share the identity traits to satisfy proof of identification requests; and/or (iv) standardize the identity traits across industries and geographic regions so that issuers can comply with conformity requirements.

SUMMARY

In one embodiment, the present invention provides a method of managing requests. The method includes providing a multipurpose messaging queue (MPMQ) as a cloud service located in a first computer accessible through a cloud. The method further includes receiving, by the MPMQ, a plurality of requests. The method further includes for each given request included in the plurality of requests: (1) receiving, by the MPMQ, a specification of whether the given request is a standard request or a critical request based on whether the given request requires an action by a second computer of a third party to respond to the given request; (2) on condition that the received specification indicates that the given request is the critical request, adding, by the MPMQ, a first message to a critical queue of messages to be accessed by the second computer of the third party, with the first message including response information that is helpful to the second computer of the third party in responding to the given request corresponding to the first message; and (3) on condition that the received specification indicates that the given request is the standard request, adding, by the MPMQ, a first message to a standard queue of messages.

In another embodiment, the present invention provides a computer program product including a computer-readable storage device and a computer-readable program code stored in the computer-readable storage device. The computer-readable program code includes instructions that are executed by a central processing unit (CPU) of a first computer to implement a method of managing requests. The method includes providing a multipurpose messaging queue (MPMQ) as a cloud service located in the first computer accessible through a cloud. The method further includes receiving, by the MPMQ, a plurality of requests. The method further includes for each given request included in the plurality of requests: (1) receiving, by the MPMQ, a specification of whether the given request is a standard request or a critical request based on whether the given request requires an action by a second computer of a third party to respond to the given request; (2) on condition that the received specification indicates that the given request is the critical request, adding, by the MPMQ, a first message to a critical queue of messages to be accessed by the second computer of the third party, with the first message including response information that is helpful to the second computer of the third party in responding to the given request corresponding to the first message; and (3) on condition that the received specification indicates that the given request is the standard request, adding, by the MPMQ, a first message to a standard queue of messages.

In another embodiment, the present invention provides a method of generating a first digital identity document. The method includes generating, by a plurality of computers, the first digital identity document, including private information, for display by a predetermined device under a predetermined form in context of encrypting specifically to the predetermined device. The generation of the first digital identity document is performed in a manner such that (i) a first sub-set of the plurality of computers, which is owned and controlled by an issuer party, has access to the private information of the first digital identity document, and (ii) a second sub-set of the plurality of computers, which is owned and controlled by a servicing party, does not have access to the private information of the first digital identity document and includes a cloud service for scalability.

Embodiments of the present invention manage inter-server communications for the delivery of digital identity documents via cloud-based services, while providing scalability, security, and ease of use features. The scalability feature allows an issuer of a digital identity document to run multiple document generator servers. The security feature allows the issuer-based services to reside within the intranet of the issuer so that only requests internal to the intranet can communicate with a document generator server and a configuration management server for generating a digital identity document and updating a configuration within the intranet. This security feature limits the liability of the cloud service provider for protecting private information included in the digital identity documents because the cloud service provider lacks knowledge of the location of the issuer's server and therefore lacks access to the private information in unencrypted form. The ease of use feature allows the issuer to avoid a need to set up and maintain links to services based within the issuer's intranet. Embodiments of the present invention allows queue processing manager to attach to a messaging queue without using a representational state transfer application programming interface (REST API) access point, thereby limiting the ability of another party to discover the messaging queue for the purpose of performing malicious acts with respect to digital identity documents.

DETAILED DESCRIPTION

Overview

Figure 1:
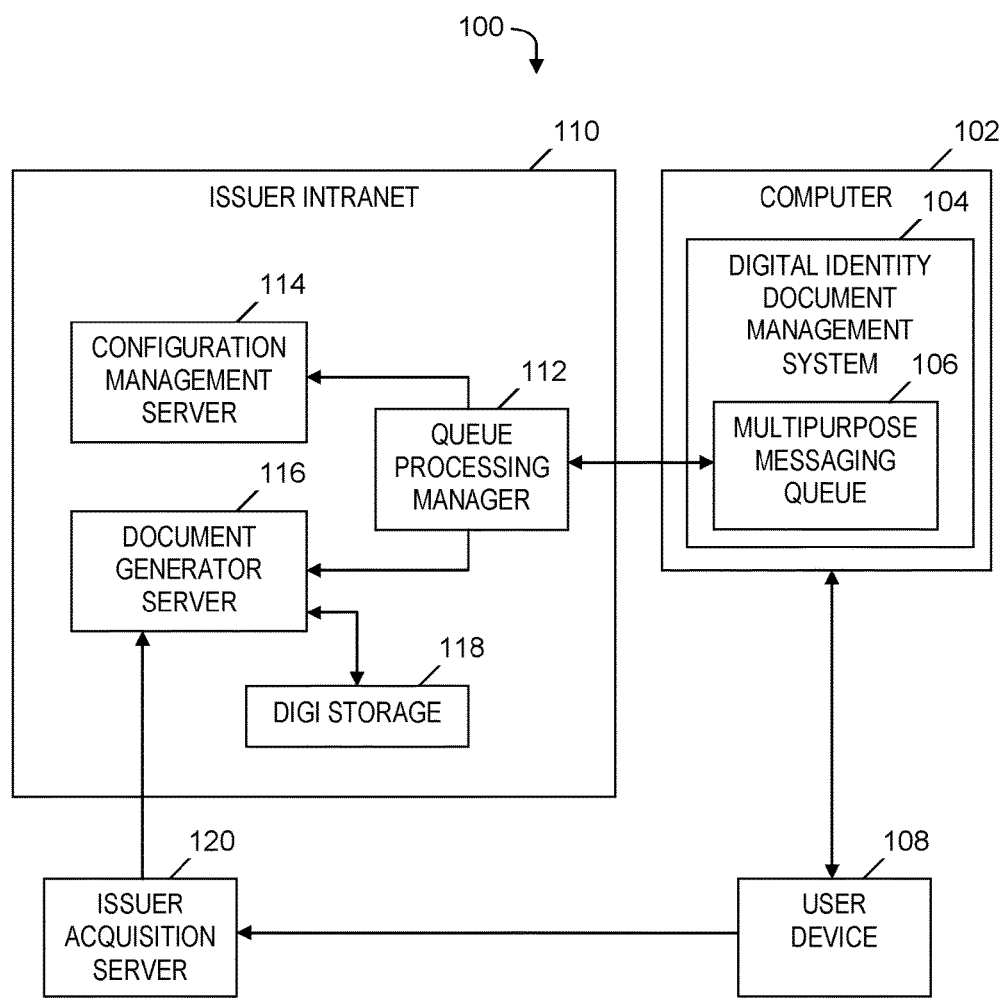
FIG. 1 is a block diagram of a system for managing requests for and generating digital identity documents, in accordance with embodiments of the present invention.

An issuer of digital identity documents that sets up its servers to generate, encrypt, and publish digital identity documents wants to avoid providing a cloud service with a location of the issuer's servers while performing actions such as updating a configuration of the issuer, issuing digital identity documents to new devices, or generating digital identity documents or passes. By avoiding providing the cloud service with the aforementioned location, the issuer enhances the scalability, security, and ease of use of the issuer services.

Some embodiments of the present invention may include one, or more, of the following features, characteristics, operations and/or advantages: (i) a multipurpose messaging queue (MPMQ) as a cloud service located in a computer accessible through a cloud; (ii) receiving, by the MPMQ, a plurality of requests; and for each given request: (iii) determining, by the MPMQ, whether the given request is a standard request or a critical request based upon whether the request requires third party action to respond to the given request; (iv) on condition that the given request is a critical request, adding, by the MPMQ, a first message to a critical queue of messages to be accessed by the third party, with the first message including response information that is helpful to the third party in responding to the given request corresponding to the first message; (v) on condition that the given request is a standard request, adding, by the MPMQ, a first message to a standard queue of messages; (vi) the third party is an issuer of identity documents; (vii) the given request is a request to generate a data set corresponding to a digital identity document; (viii) the first message includes information helpful in generating the digital identity document; (ix) the plurality of requests are fetched from a queue processing manager (QPM) component in an intranet controlled by the third party; (x) the QPM is not and does not include a REST API; (xi) generating, by a plurality of computers, a first digital identity document, including private information, for display by a predetermined device under a predetermined form in context of encrypting specifically to the predetermined device, with the generation being performed in a manner such that: (a) a first sub-set of the plurality of computers, which is owned and controlled by an issuer party, has access to the private information of the first digital identity document, and (b) a second sub-set of the plurality of computers, which is owned and controlled by a servicing party, does not have access to the private information of the first digital identity document and includes a cloud service for scalability; (xii) one of the sharing parties cannot know where the other party is and needs to send it notifications and updates without a known location; (xiii) protects security by an obfuscated location and/or having no open access API that any outside agent would be able to call; (xiv) use publish/subscription model for configuration and API requests to increase security and/or decrease vulnerability; and/or (xv) uses API to call to attempt to spoof an action.

Some embodiments of the present invention may include a multi-purpose message queue (MPMQ). As used herein, an MPMQ is any MQ that has a server wrapped around the MQ so that input can be taken from an account management server.

System for Digital Identity Document Management

FIG. 1 is a block diagram of a system 100 for digital identity document management, in accordance with embodiments of the present invention. System 100 includes a computer 102 which executes a software-based digital identity document management system 104, which includes a multipurpose messaging queue (MPMQ) 106 and an account management server (not shown). In one embodiment, computer 102 is a central server that provides cloud services including MPMQ 106. For each issuer of digital identity documents, MPMQ 106 provides one or more corresponding queues for requests for the generation of a digital identity document or an update of a configuration for the issuer. A user device 108 sends requests to generate digital identity documents to computer 102.

System 100 includes an issuer intranet 110, which includes an issuer server (not shown) that provides the following issuer services: a queue processing manager (QPM) 112, a configuration management server 114, a document generator server 116, and a digital identity generation instructions (DIGI) storage 118.

The issuer who owns and controls issuer intranet 110 subscribes to MPMQ 106 via the QPM 112, which resides within issuer intranet 110. QPM 112 monitors MPMQ 106 for requests for actions that need to be performed and executes the actions. When computer 102 needs one of the issuer services to perform an action, computer 102 puts a request for the action onto a queue provided by MPMQ 106, where the queue corresponds to the issuer that is the target of the action. Examples of actions that can be requested include cloning an existing digital identity document to a newly registered user device, generating a pass (also known as a digital coupon or a digital ticket) for user device 108 (e.g., store coupon, boarding pass, or event ticket), deleting a digital identity document record from DIGI storage 118, and triggering an update of the configuration for the issuer. Requests from computer 102 are handled via MPMQ 106 as described above so that the entity (e.g., cloud service provider) controlling computer 102 has no knowledge of where the issuer services reside, and keeps configuration manager server 114 and document generator server 116 from having to publish their Internet Protocol (IP) address outside of issuer intranet 110.

In one embodiment, MPMQ 106 resides on computer 102 (i.e., central server of a cloud service provider) and has two separate channels for each issuer: a standard queue channel and a critical queue channel. When the cloud service provider needs the issuer to perform an action (e.g., generate a new digital identity document, delete information about a digital identity document from DIGI storage 118, or update the local information of the issuer), computer 102 adds a message onto the appropriate queue channel. For example, if a digital identity document needs to be generated, the request is added to the critical queue channel together with the user device details needed for the generation.

In this embodiment, MPMQ 106 includes code to provide for the following areas of control and/or functionality: (i) durability (messages may be kept in memory, written to disk, or even committed to a database management system if the need for reliability indicates a more resource-intensive solution); (ii) security policies (to determine which applications should have access to the messages); (iii) message purging policies (queues or messages may be subject to time limitations); (iv) message filtering (filtering data so that a subscriber may only see messages matching some pre-specified criteria of interest); (v) delivery policies (guarantees that a message on the number of times a message is delivered); (vi) routing policies (in a system with many queue servers, determination of which servers should receive a message or an MQ's messages); (vii) batching policies; (viii) queuing criteria (determination of the conditions under which a message should be considered as being "enqueued"); (ix) receipt notification (a publisher may need to know when subscribers have received a message).

In one embodiment, QPM 112 is an issuer component that resides within issuer intranet 110. Using the issuer's account number and API key as login information, QPM 112 monitors its standard and critical queue channels and takes any action that is requested. The relationship between QPM 112 and MPMQ 106 tightens security because the issuer intranet 110 can contact computer 102, but QPM 112 is not, and does not include, a REST API access point, which allows the central server (i.e., computer 102) to have no knowledge of where the issuer server resides and has no knowledge of where to access the issuer server even if the issuer server had a REST API. By not being and not including a REST API access point, QPM 112 prevents a malicious entity external to issuer intranet 110 from acquiring information in digital identity documents.

Configuration management server 114 fetches the configuration and artifacts for an issuer of digital identity documents by retrieving the configuration and artifacts from computer 102. Configuration management server 114 stores the retrieved configuration and artifacts. In one embodiment, the configuration includes the issuer's account number, application programming interface (API) key, profile information (e.g., name and logo), document type definitions, role definitions, and pass definitions. In one embodiment, the artifacts include a public key of the cloud service provider, a Secure Sockets Layer (SSL) certificate, issuer public key, and issuer certificate. Configuration management server 114 fetches updates from computer 102 when instructed by queue processing manager 112 and notifies document generator server 116 to update its local cache of stored configuration and artifacts.

Document generator server 116 generates, encrypts, and publishes digital identity documents. In order to limit access to privacy information, document generator server 116 encrypts a digital identity document for user device 108 so that the encryption is unique to the identification of user device 108. In one embodiment, document generator server 116 is a cloud service. In response to generating a digital identity document, document generator server 116 stores a copy of the instructions used to generate the digital identity document in DIGI storage 118.

DIGI storage 118 stores copies of digital identity documents that were previously generated by document generator server 116. In response to a request for a generation of a copy of an existing digital identity document for an additional user device, document generator server 116 accesses the existing digital identity document from DIGI storage 118. Because DIGI storage 118 is located within issuer intranet 110, computer 102 is not able to access any user information included in the digital identity document. Computer 102 has no knowledge of the contents of the digital identity document other than its identification number, thereby allowing the organization that owns and controls computer 102 to have limited liability with respect to protecting privacy information in the digital identity document.

An issuer acquisition server 120 directly calls document generator server 116 to request that a digital identity document be generated for user device 108. Issuer acquisition server 120 provides issuer-created acquisition pages that are used by user device 108 to request that a digital identity document be generated for the user device 108.

The functionality of the components shown in FIG. 1 is described in more detail in the discussion of FIG. 2, FIG. 3, FIG. 4, FIG. 5, and FIG. 6 presented below.

Process for Managing Digital Identity Documents

Figure 2:
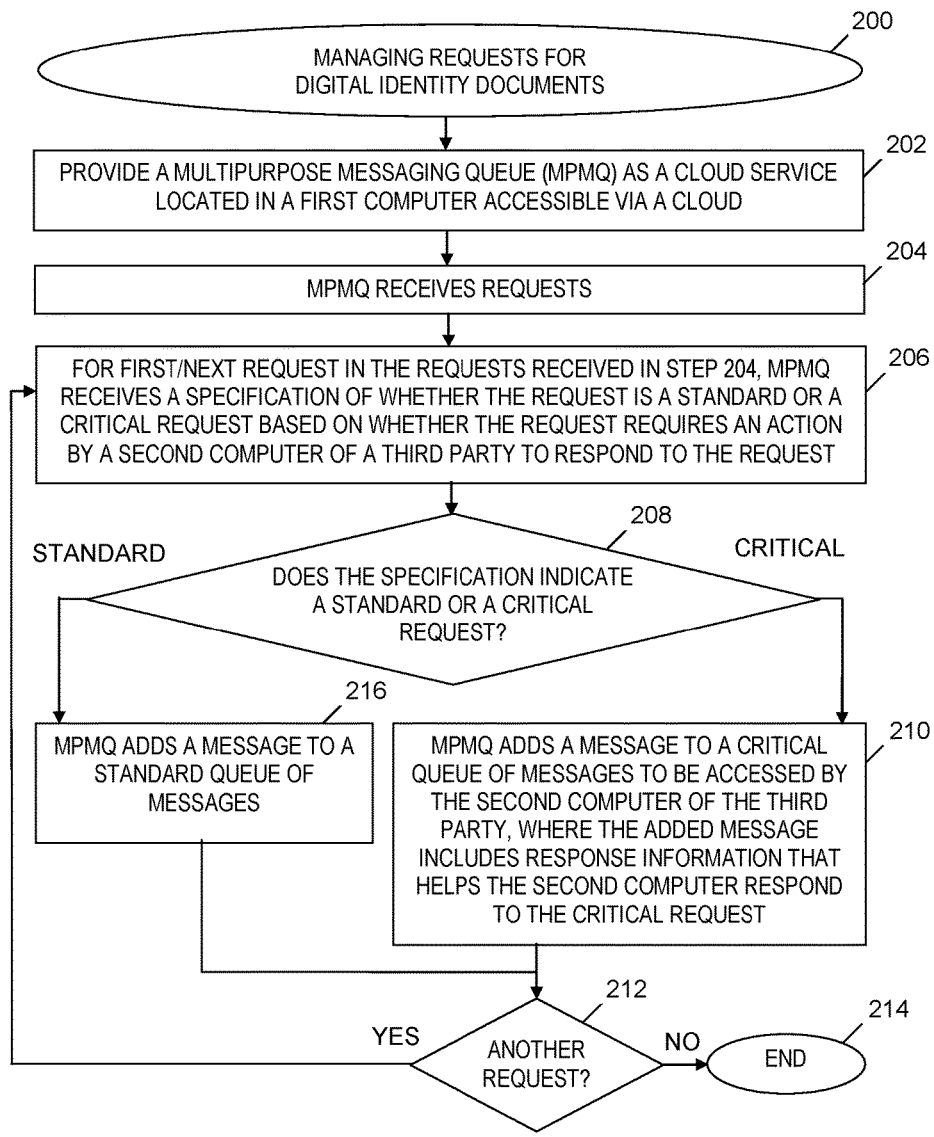
FIG. 2 is a flowchart of a process of managing requests for digital identity documents, where the process is implemented in the system of FIG. 1, in accordance with embodiments of the present invention.

FIG. 2 is a flowchart of a process of managing requests for digital identity documents, where the process is implemented in the system of FIG. 1, in accordance with embodiments of the present invention. The process of FIG. 2 begins at step 200. In step 202, system 100 (see FIG. 1) provides multipurpose messaging queue (MPMQ) 106 as a cloud service located in computer 102 (see FIG. 1) (i.e., a first computer), which is accessible via a cloud.

In step 204, MPMQ 106 (see FIG. 1) receives requests from an account management server in computer 102 via a REST API. In one embodiment, the requests include requests to generate digital identity documents and other requests to update a configuration of an issuer of digital identity documents.

In step 206, for a first request or a next request in the requests received in step 204), MPMQ 106 (see FIG. 1) receives a specification of whether the first or next request is a standard request or a critical request. If a request requires an action by a second computer of a third party to respond to the first or next request, then the request is a critical request; otherwise, the request is a standard request. In one embodiment, the third party is an issuer party that issues digital identity documents and that provides issuer service(s) of issuer intranet 110 (see FIG. 1). If step 206 is being performed for the first time in the process of FIG. 2, then the step 206 discussion presented above refers to the first request in the requests received in step 204. If step 206 is being performed a subsequent time in the process of FIG. 2 (i.e., after the process loops back to step 206, as discussed below), then the step 206 discussion presented above refers to a next request in the requests received in step 204 (i.e., a request in the received requests that has not yet been processed by steps in FIG. 2 subsequent to step 206). Hereinafter in the discussion of FIG. 2, the first request and the next request referred to in step 206 are referred to as "the request."

In step 208, first computer 102 (see FIG. 1) determines whether the specification received in step 206 indicates that the request is a critical request or a standard request. If the request is a critical request, then the "CRITICAL" branch of step 208 is taken and step 210 is performed.

In step 210, based on the request being a critical request, MPMQ 106 (see FIG. 1) adds a message to a critical queue of messages to be accessed by the second computer of the third party, where the added message includes response information that assists the second computer in responding to the critical request.

In step 212, MPMQ 106 (see FIG. 1) determines whether there is another request in the requests received in step 204 that has not yet been processed by the steps 206, 208 and a step subsequent to step 208.

If MPMQ 106 (see FIG. 1) determines in step 212 that there is another request remaining to be processed, then the Yes branch of step 212 is taken and step 206 is performed to obtain a next request in the requests received in step 204.

If MPMQ 106 (see FIG. 1) determines in step 212 that there is no other request that is remaining to be processed, then the No branch of step 212 is taken and the process of FIG. 2 ends at step 214.

Returning to step 208, if the request is a standard request (i.e., the request does not require an action by the second computer of the third party to respond to the request), then the "STANDARD" branch of step 208 is taken and MPMQ 106 (see FIG. 1) performs step 216. In step 216, MPMQ 106 (see FIG. 1) adds a message to a standard queue of messages. Following step 216, step 212 is performed, as described above. The process of FIG. 2 ends at step 214 after the No branch of step 212 is taken, as described above.

In one embodiment, QPM 112 (see FIG. 1) is subscribed to MPMQ 106 (see FIG. 1) and monitors the messages added to MPMQ 106 (see FIG. 1). In one embodiment, after the step 210 or step 216, QPM 112 (see FIG. 1) fetches the message that was added to MPMQ 106 (see FIG. 1) and sends the fetched message to (i) document generation server 116 (see FIG. 1) if the message includes response information for generating a digital identity document or (ii) configuration management server 114 (see FIG. 1) if the message includes response information for updating a configuration of the issuer services. If document generation server 116 (see FIG. 1) receives the message from MPMQ 106 (see FIG. 1), then document generation server 116 (see FIG. 1) completes the generation of the digital identity document. If configuration management server 114 (see FIG. 1) receives the message from MPMQ 106 (see FIG. 1), then configuration management server 114 (see FIG. 1) completes the update of the configuration of the issuer services.

In one embodiment, computer 102 (see FIG. 1) receives from QPM 112 (see FIG. 1) a request for QPM 112 (see FIG. 1) to subscribe to MPMQ 106 (see FIG. 1). Computer 102 (see FIG. 1) receives a set of predefined rules that identify first types of requests as being standard requests and identify second types of requests as being critical requests, where the first and second types are mutually exclusive. Based on the predefined rules, computer 102 (see FIG. 1) identifies a type of the request. Computer 102 (see FIG. 1) determines that the identified type is included in the first types or the second types of requests. If the identified type is included in the first types, then receiving the specification in step 206 includes receiving the specification that indicates that the request is the standard request. If the identified type is included in the second types, then receiving the specification in step 206 includes receiving the specification that indicates that the request is the critical request.

Processes for Generating Digital Identity Documents

Figure 3:
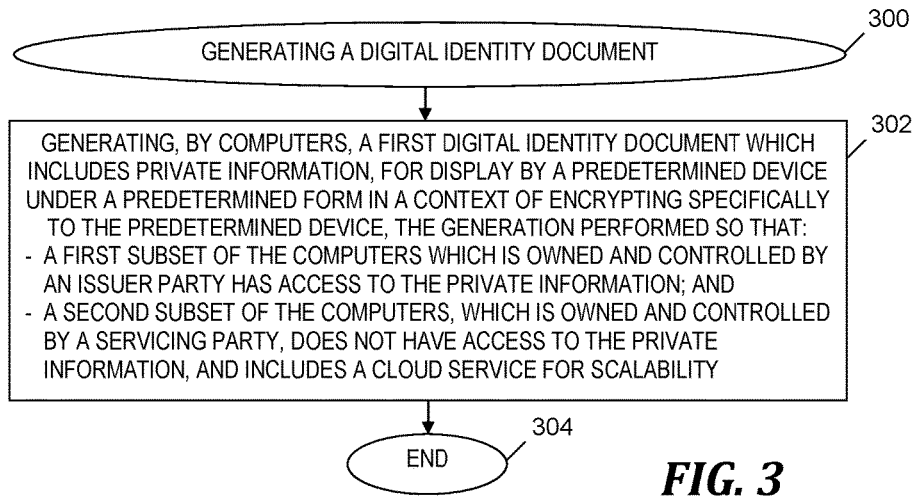
FIG. 3 is a flowchart of a process of generating a digital identity document, where the process is implemented in the system of FIG. 1, in accordance with embodiments of the present invention.

FIG. 3 is a flowchart of a process of generating a digital identity document, where the process is implemented in the system of FIG. 1, in accordance with embodiments of the present invention. The process of FIG. 3 begins at step 300. In step 302, computers generate a first digital identity document which includes private information, for display by a predetermined device (i.e., user device 108 (see FIG. 1)) under a predetermined form in a context of encrypting specifically to the predetermined device. The aforementioned computers generate the first digital identity document so that (1) a first subset of the computers, which is owned and controlled by an issuer party, has access to the private information; and (2) a second subset of the computers, which is owned and controlled by a servicing party, does not have access to the private information and includes a cloud service for scalability. The process of FIG. 3 ends at step 304. In one embodiment, the aforementioned computers include a computer providing the services of issuer acquisition server 120 (see FIG. 1) and one or more computers in issuer intranet 110 (see FIG. 1) that provide the services of document generator server 116 (see FIG. 1) and configuration management server 114 (see FIG. 1).

Figure 4:
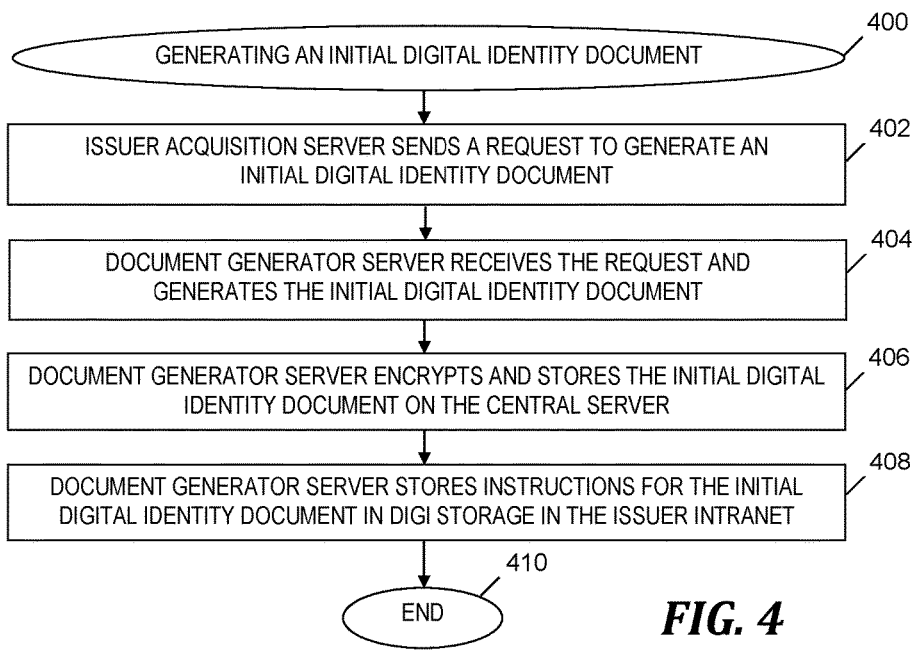
FIG. 4 is a flowchart of a process of generating an initial digital identity document within the process of FIG. 3, in accordance with embodiments of the present invention.

FIG. 4 is a flowchart of a process of generating an initial digital identity document within the process of FIG. 3, in accordance with embodiments of the present invention. The process of FIG. 4 starts at step 400. In one embodiment, the process of FIG. 4 is included in step 302 (see FIG. 3).

In step 402, issuer acquisition server 120 (see FIG. 1) sends a request to generate an initial digital security document. Issuer acquisition server 120 (see FIG. 1) sends the request to document generator server 116 (see FIG. 1).

In step 404, document generator server 116 (see FIG. 1) receives the request sent in step 402 and generates the initial digital identity document.

In step 406, document generator server 116 (see FIG. 1) encrypts and stores the initial digital identity document on computer 102 (see FIG. 1) (i.e., on a central server).

In step 408, document generator server 116 (see FIG. 1) stores instructions for the initial digital identity document in DIGI storage 118 (see FIG. 1) in issuer intranet 110 (see FIG. 1). Following step 408, the process of FIG. 4 ends at step 410.

Figure 5:
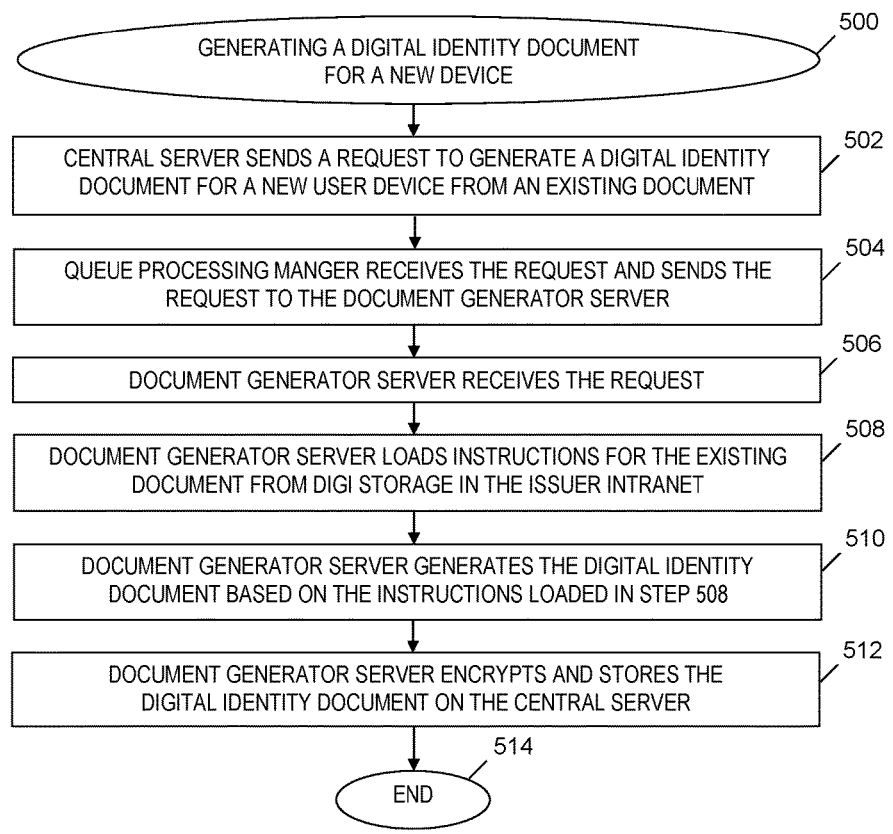
FIG. 5 is a flowchart of a process of generating a digital identity document for a new device within the process of FIG. 3, in accordance with embodiments of the present invention.

FIG. 5 is a flowchart of a process of generating a digital identity document for a new device within the process of FIG. 3, in accordance with embodiments of the present invention. The process of FIG. 5 starts at step 500. In one embodiment, the process of FIG. 5 is included in step 302 (see FIG. 3).

In step 502, computer 102 (see FIG. 1) (i.e., central server) sends a request to generate a digital identity document for a new user device (i.e., a user device other than user device 108 in FIG. 1) from an existing digital identity document that had been previously generated for user device 108 (see FIG. 1).

In step 504, queue processing manager 112 (see FIG. 1) receives the request sent in step 502. In response to receiving the request in step 504, queue processing manager 112 (see FIG. 1) sends the request to document generator server 116 (see FIG. 1).

In step 506, document generator server 116 (see FIG. 1) receives the request.

In step 508, document generator server 116 (see FIG. 1) loads instructions for the existing digital identity document from DIGI storage 118 (see FIG. 1) in issuer intranet 110 (see FIG. 1).

In step 510, document generator server 116 (see FIG. 1) generates the digital identity document based on the instructions loaded in step 508.

In step 512, document generator server 116 (see FIG. 1) encrypts the digital identity document and stores the encrypted digital identity document on computer 102 (see FIG. 1).

Following step 512, the process of FIG. 5 ends at step 514.

Computer System

Figure 6:
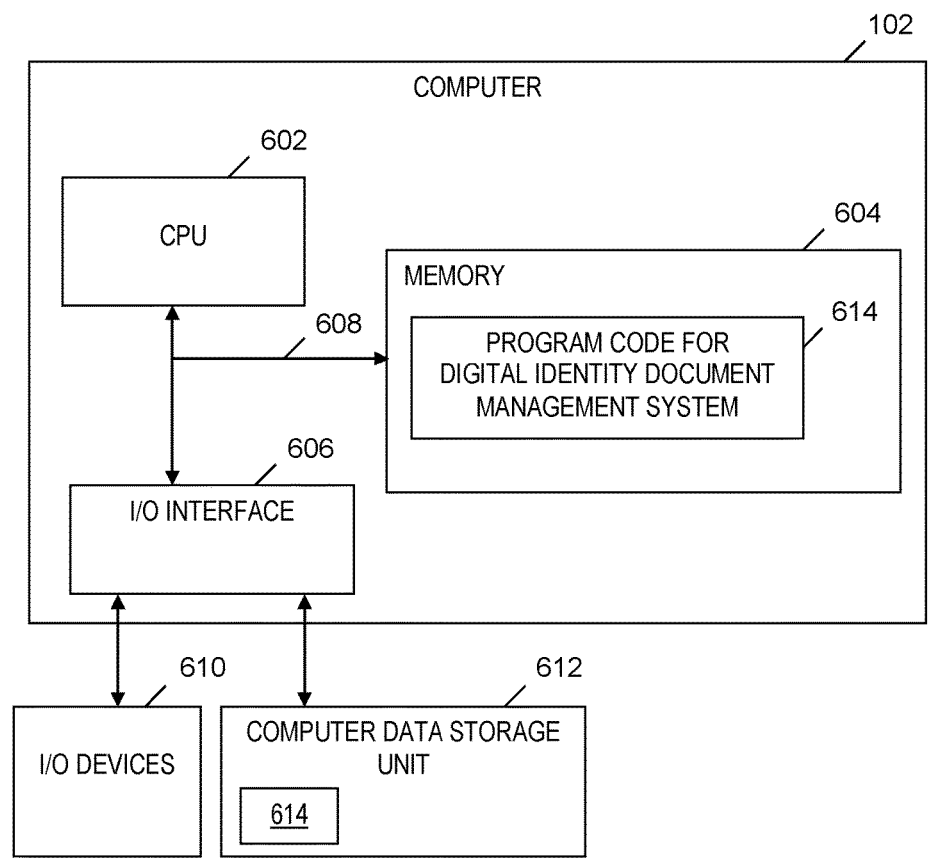
FIG. 6 is a block diagram of a computer that is included in the system of FIG. 1 and that implements the processes of FIG. 2, FIG. 3, FIG. 4, and FIG. 5 in accordance with embodiments of the present invention.

FIG. 6 is a block diagram of a computer that is included in the system of FIG. 1 and that implements the processes of FIG. 2, FIG. 3, FIG. 4, and FIG. 5 in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for digital identity document management system 104 (see FIG. 1) to perform a method of managing digital identity documents, where the instructions are executed by CPU 602 via memory 604. CPU 602 may include a single processing unit, or be distributed across one or more processing units in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are executed by CPU 602 via memory 604 to manage digital identity documents. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

Storage unit 612 and/or one or more other computer data storage units (not shown) that are coupled to computer 102 may store digital identity documents and values that specify a configuration of an issuer, and may include DIGI storage 118 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to manage digital identity documents. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to manage digital identity documents. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing digital identity documents.

While it is understood that program code 614 for managing digital identity documents may be deployed by manually loading directly in client, server and proxy computers (not shown) via loading a computer-readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing digital identity documents. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, FIG. 4, and FIG. 5) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
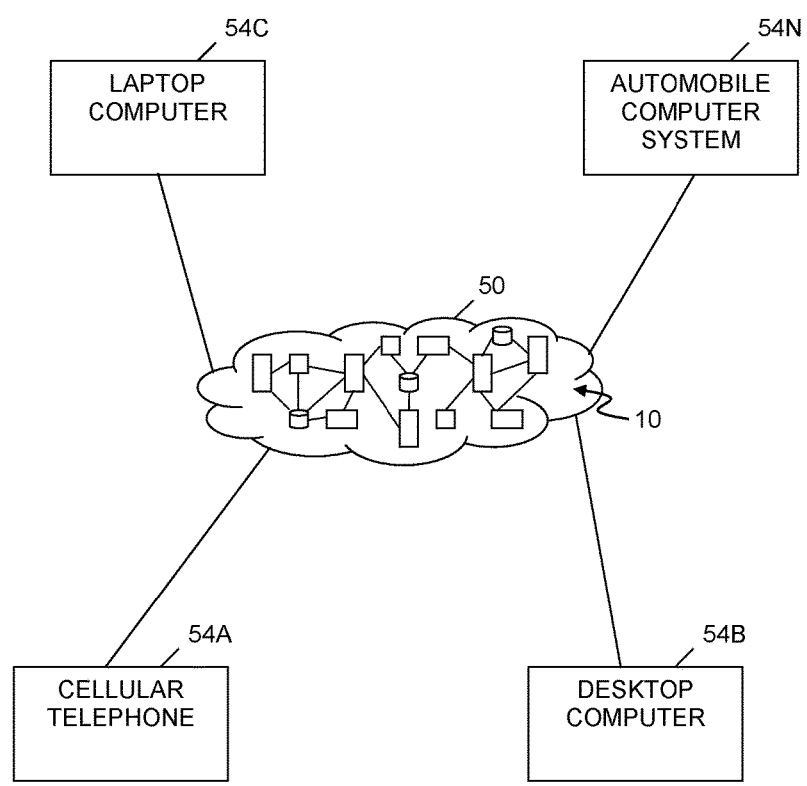
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
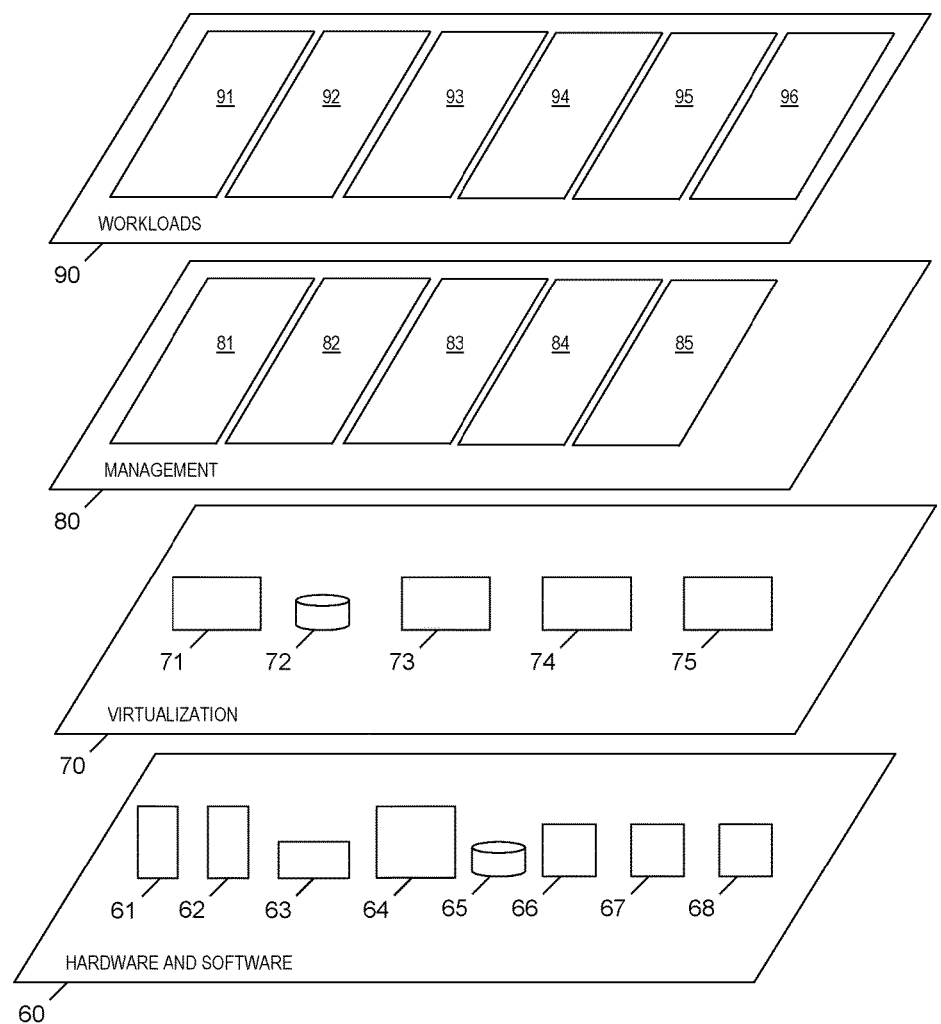
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and request management and digital identity document generation and delivery 96.

What is claimed is:

1. A method of managing requests, the method comprising the steps of:
   providing a multipurpose messaging queue (MPMQ) as a cloud service located in a first computer accessible through a cloud;
   receiving, by the MPMQ, a plurality of requests; and
   for each given request included in the plurality of requests:
      receiving, by the MPMQ, a specification of whether the given request is a standard request or a critical request based on whether the given request requires an action by a second computer of a third party to respond to the given request,
      on condition that the received specification indicates that the given request is the critical request, adding, by the MPMQ, a first message to a critical queue of messages to be accessed by the second computer of the third party, with the first message including response information that is helpful to the second computer of the third party in responding to the given request corresponding to the first message, and
      on condition that the received specification indicates that the given request is the standard request, adding, by the MPMQ, a first message to a standard queue of messages.

2. The method of claim 1, wherein:
   the third party is an issuer of identity documents;
   the given request is a request to generate a data set corresponding to a digital identity document; and
   the first message includes information helpful in generating the digital identity document.

3. The method of claim 1, wherein the step of receiving the plurality of requests includes receiving the plurality of requests so that a queue processing manager (QPM) component in an intranet controlled by the third party accesses the plurality of requests in the MPMQ, wherein the QPM is not, and does not include, a representational state transfer application programming interface (REST API).

4. The method of claim 1, further comprising the steps of:
receiving, by the first computer and from a queue processing manager (QPM) component in an intranet controlled by the third party, a request to subscribe to the MPMQ
receiving, by the first computer, a set of predefined rules that associate first types of requests with the standard request and second types of requests with the critical request, the first and second types being mutually exclusive;
based on the predefined rules, identifying, by the first computer, a type of the given request;
determining, by the first computer, that the identified type is included in the first types or the second types; and
if the identified type is included in the first types, the step of receiving the specification of whether the given request is the standard request or the critical request includes receiving the specification that indicates that the given request is the standard request or if the identified type is included in the second types, the step of receiving the specification of whether the given request is the standard request or the critical request includes receiving the specification that indicates that the given request is the critical request.

5. The method of claim 1, further comprising the steps of:
receiving, by the MPMQ, a request to perform an update of a configuration of one or more services provided by the third party, the third party being an issuer party that issues digital identity documents, the one or more services providing a generation, an encryption, and a publishing of the digital identity documents;
receiving, by the MPMQ, a specification that indicates that the update of the configuration does not require a generation of a digital identity document and that the request to perform the update of the configuration is the standard request; and
based on the update of the configuration not requiring the generation of the digital identity document and the request to perform the update being the standard request, adding, by the MPMQ, the first message to the standard queue of messages, the first message specifying the update of the configuration, wherein the standard queue of messages is configured for a fetching of the first message by a queue processing manager (QPM) component in an intranet controlled by the issuer party, the QPM being subscribed to the MPMQ, wherein the QPM sends the fetched first message to a configuration management server in the intranet controlled by the issuer party and the configuration management server subsequently completes the update of the configuration, without requiring a location of the configuration management server to be provided to the first computer.

6. The method of claim 1, further comprising the steps of:
receiving, by the MPMQ, a request to generate a new digital identity document;
receiving, by the MPMQ, a specification that indicates that the request to generate the new digital identity document is the critical request; and
based on the request being for a generation of the new digital identity document and the request to generate the new digital identity document being the critical request, adding, by the MPMQ, the first message to the critical queue of messages, the first message specifying the generation of the new digital identity document, wherein the critical queue of messages is configured for a fetching of the first message by a queue processing manager (QPM) component in an intranet controlled by an issuer party which is the third party, the QPM being subscribed to the MPMQ, wherein the QPM sends the fetched first message to a queue processing manager (QPM) component in the intranet controlled by the issuer party and the QPM sends the fetched first message to a document generation server in the intranet controlled by the issuer party and the document generation server subsequently completes the generation of the new digital identity document, without requiring a location of the document generator server to be provided to the first computer.

7. The method of claim 1, further comprising the step of:
providing at least one support service for at least one of creating, integrating, hosting, maintaining, and deploying computer-readable program code in the first computer, the program code being executed by a processor of the first computer to implement the steps of providing the MPMQ, receiving the plurality of requests, receiving the specification of whether the given request is the standard or critical request, on condition that the received specification indicates that the given request is the critical request, adding the first message to the critical queue of messages, and on condition that the received specification indicates that the given request is the standard request, adding the first message to the standard queue of messages.

8. A computer program product, comprising:
a computer-readable storage device; and
a computer-readable program code stored in the computer-readable storage device, the computer-readable program code containing instructions that are executed by a central processing unit (CPU) of a first computer to implement a method of managing requests, the method comprising the steps of:
providing a multipurpose messaging queue (MPMQ) as a cloud service located in the first computer accessible through a cloud;
receiving, by the MPMQ, a plurality of requests; and
for each given request included in the plurality of requests:
receiving, by the MPMQ, a specification of whether the given request is a standard request or a critical request based on whether the given request requires an action by a second computer of a third party to respond to the given request,
on condition that the received specification indicates that the given request is the critical request, adding, by the MPMQ, a first message to a critical queue of messages to be accessed by the second computer of the third party, with the first message including response information that is helpful to the second computer of the third party in responding to the given request corresponding to the first message, and
on condition that the received specification indicates that the given request is the standard request, adding, by the MPMQ, a first message to a standard queue of messages.

9. The computer program product of claim 8, wherein:
the third party is an issuer of identity documents;
the given request is a request to generate a data set corresponding to a digital identity document; and
the first message includes information helpful in generating the digital identity document.

10. The computer program product of claim 8, wherein the step of receiving the plurality of requests includes receiving the plurality of requests so that a queue processing manager (QPM) component in an intranet controlled by the third party accesses the plurality of requests in the MPMQ, and wherein the QPM is not, and does not include, a representational state transfer application programming interface (REST API).

11. The computer program product of claim 8, wherein the method further comprises the steps of:
- receiving, by the first computer and from a queue processing manager (QPM) component in an intranet controlled by the third party, a request to subscribe to the MPMQ
- receiving, by the first computer, a set of predefined rules that associate first types of requests with the standard request and second types of requests with the critical request, the first and second types being mutually exclusive;
- based on the predefined rules, identifying, by the first computer, a type of the given request;
- determining, by the first computer, that the identified type is included in the first types or the second types; and
- if the identified type is included in the first types, the step of receiving the specification of whether the given request is the standard request or the critical request includes receiving the specification that indicates that the given request is the standard request or if the identified type is included in the second types, the step of receiving the specification of whether the given request is the standard request or the critical request includes receiving the specification that indicates that the given request is the critical request.

12. The computer program product of claim 8, wherein the method further comprises the steps of:
- receiving, by the MPMQ, a request to perform an update of a configuration of one or more services provided by the third party, the third party being an issuer party that issues digital identity documents, the one or more services providing a generation, an encryption, and a publishing of the digital identity documents;
- receiving, by the MPMQ, a specification that indicates that the update of the configuration does not require a generation of a digital identity document and that the request to perform the update of the configuration is the standard request; and
- based on the update of the configuration not requiring the generation of the digital identity document and the request to perform the update being the standard request, adding, by the MPMQ, the first message to the standard queue of messages, the first message specifying the update of the configuration, wherein the standard queue of messages is configured for a fetching of the first message by a queue processing manager (QPM) component in an intranet controlled by the issuer party, the QPM being subscribed to the MPMQ, wherein the QPM sends the fetched first message to a configuration management server in the intranet controlled by the issuer party and the configuration management server subsequently completes the update of the configuration, without requiring a location of the configuration management server to be provided to the first computer.

13. The computer program product of claim 8, wherein the method further comprises the steps of:
- receiving, by the MPMQ, a request to generate a new digital identity document;
- receiving, by the MPMQ, a specification that indicates that the request to generate the new digital identity document is the critical request; and
- based on the request being for a generation of the new digital identity document and the request to generate the new digital identity document being the critical request, adding, by the MPMQ, the first message to the critical queue of messages, the first message specifying the generation of the new digital identity document, wherein the critical queue of messages is configured for a fetching of the first message by a queue processing manager (QPM) component in an intranet controlled by an issuer party which is the third party, the QPM being subscribed to the MPMQ, wherein the QPM sends the fetched first message to a queue processing manager (QPM) component in the intranet controlled by the issuer party and the QPM sends the fetched first message to a document generation server in the intranet controlled by the issuer party and the document generation server subsequently completes the generation of the new digital identity document, without requiring a location of the document generator server to be provided to the first computer.

\* \* \* \* \*